United States Patent
Canpolat et al.

(10) Patent No.: US 12,015,951 B2
(45) Date of Patent: Jun. 18, 2024

(54) EXTENSIBLE ENHANCED QOS FRAMEWORK FOR SIGNALING REQUIREMENTS

(71) Applicant: Intel Corporation, Santa Clara, CA (US)

(72) Inventors: Necati Canpolat, Beaverton, OR (US); Dibakar Das, Hilsboro, OR (US); Ganesh Venkatesan, Hillsboro, OR (US); Chittabrata Ghosh, Fremont, CA (US); Dave A. Cavalcanti, Portland, OR (US); Cheng Chen, Camas, WA (US); Juan Fang, Portland, OR (US); Laurent Cariou, Portland, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 17/482,025

(22) Filed: Sep. 22, 2021

(65) Prior Publication Data
US 2022/0007236 A1   Jan. 6, 2022

Related U.S. Application Data

(60) Provisional application No. 63/082,022, filed on Sep. 23, 2020.

(51) Int. Cl.
*H04W 28/24* (2009.01)
*H04W 28/02* (2009.01)

(52) U.S. Cl.
CPC ....... *H04W 28/24* (2013.01); *H04W 28/0268* (2013.01)

(58) Field of Classification Search
None
See application file for complete search history.

(56) References Cited

U.S. PATENT DOCUMENTS

| 2014/0119178 A1* | 5/2014 | Zhao | H04W 28/0263 |
| | | | 370/230 |
| 2018/0227891 A1* | 8/2018 | Yang | H04W 74/02 |

\* cited by examiner

*Primary Examiner* — Minh Trang T Nguyen
(74) *Attorney, Agent, or Firm* — Schwegman Lundberg & Woessner, P.A.

(57) ABSTRACT

A Quality-of-Service (QoS) Management AP is configured to support QoS Management features and to perform a QoS Management Protocol. The AP decodes an Enhanced Add Traffic Stream (E-ADDTS) Request QoS Action Frame (E-ADDTS Req) received from a station (STA) to initiate QoS setup for a traffic stream. The STA may be a QoS Management STA configured to support the QoS Management features and perform the QoS Management protocol. The AP may encode, for transmission to the STA in response to the E-ADDTS Req, an E-ADDTS Response QoS Action Frame (E-ADDTS Resp) which includes a status code to indicate whether the QoS setup has been accepted. When the QoS setup is accepted, the E-ADDTS Resp includes a QoS setup ID within a QoS setup ID field in the E-ADDTS Resp that uniquely identifies the QoS setup for the traffic stream.

15 Claims, 6 Drawing Sheets

EXTENSIBLE ENHANCED QOS FRAMEWORK FOR SIGNALING REQUIREMENTS

PRIORITY CLAIM

This application claims priority under 35 USC 119 to U.S. Provisional Patent Application Ser. No. 63/082,022, filed Sep. 23, 2020 [reference number AD2647-Z] which is incorporated herein by reference in its entirety.

TECHNICAL FIELD

Embodiments pertain to wireless communications. Some embodiments relate to wireless local area networks (WLANs) including the IEEE 802.11 standards. Some embodiments relate to quality of service (QoS) management. Some embodiments relate to QoS management in accordance with the WI-FI Alliance (WFA) and the WFA QoS Management Specification.

BACKGROUND

One issue with communicating data over a wireless network is signalling QoS requirements. The IEEE 802.11 specification defines a mechanism to signal QoS requirements of 802.11 Stations (STAs) to the 802.11 Access Point (AP) they are associated with. However, an AP needs to enforce network policies and current QoS requirement signalling is not flexible enough to address an evolving network environment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The IEEE 802.11 specifications define mechanisms to signal QoS requirements of 802.11 Stations (STAs) to the 802.11 Access Point (AP) they are associated with. While this meets the requirements from a STA perspective, there are scenarios where the AP needs to enforce network policies (some due to network operating conditions) for which there are no signaling mechanisms defined, and where the QoS requirement signaling is not flexible enough to take into account newer traffic types (AR/VR, Time Sensitive Networking, etc.) and new evolving mechanisms in IEEE802.11 that provides for dynamic adaptation to wireless channel conditions to maintain latency, reliability and throughput mechanisms in order to deliver the required QoS.

Figure 3:
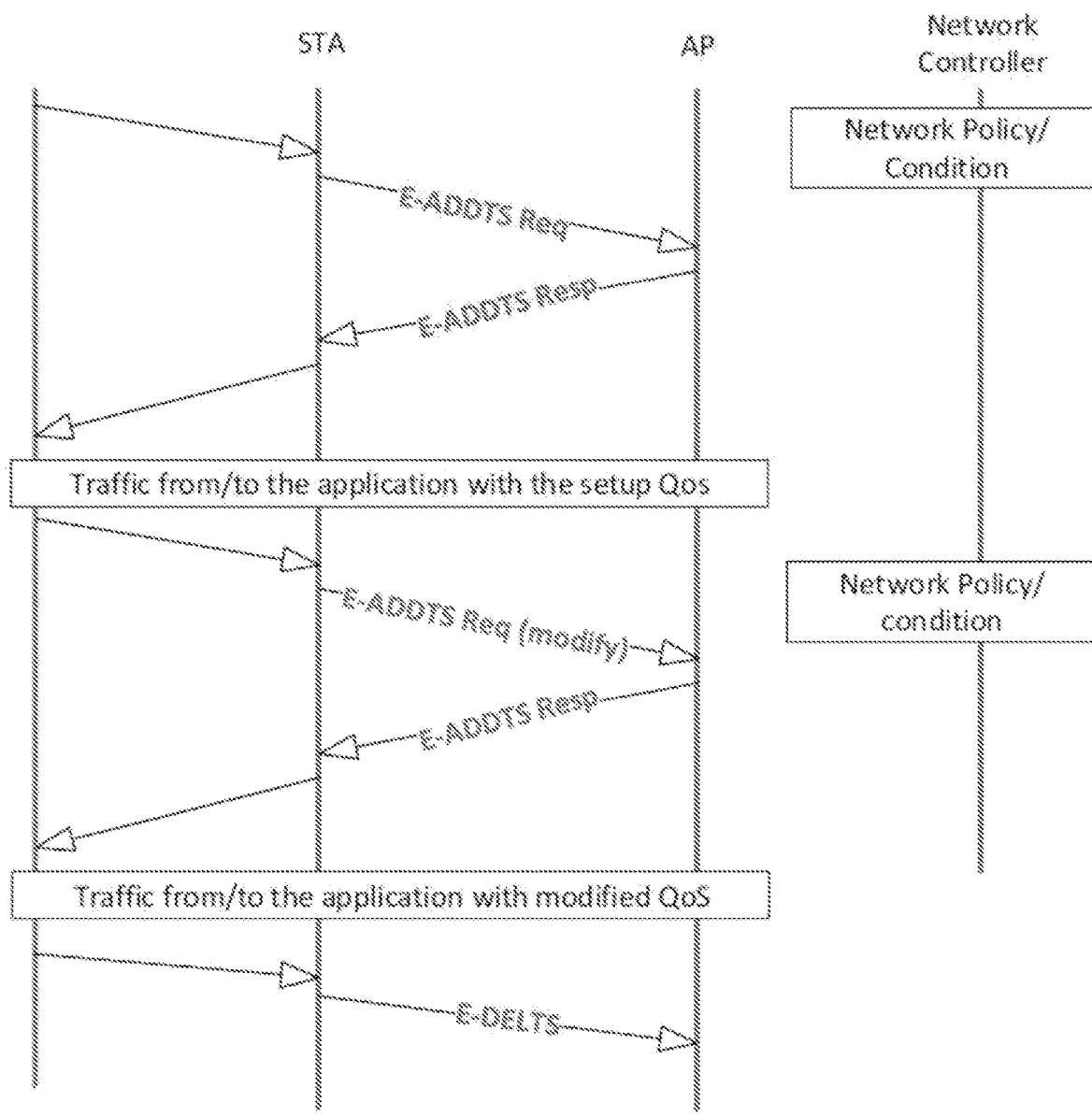
FIG. 3 illustrates STA modification of a QoS Setup midway through the QoS traffic flow, in accordance with some embodiments.
Figure 4:
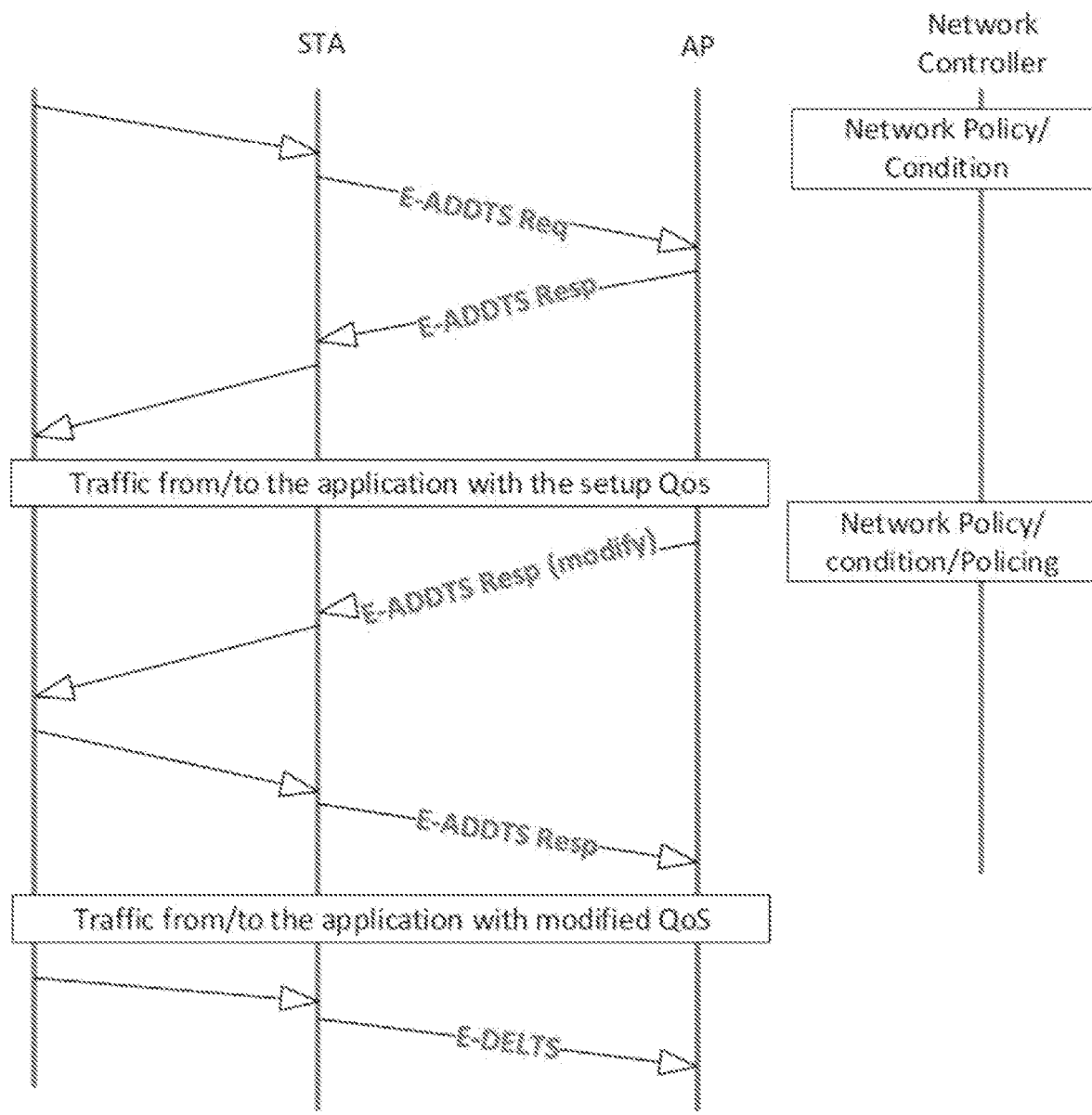
FIG. 4 illustrates AP modification of a QoS Setup midway through the QoS traffic flow, in accordance with some embodiments.

Some embodiments are directed to an access point (AP) configured as a Quality-of-Service (QoS) Management AP to support QoS Management features and to perform a QoS Management Protocol. In these embodiments, as part of the QoS Management Protocol, the AP is configured to decode an Enhanced Add Traffic Stream (E-ADDTS) Request QoS Action Frame (E-ADDTS Req) received from a station (STA) to initiate QoS setup for a traffic stream. The STA may be a QoS Management STA configured to support the QoS Management features and perform the QoS Management protocol. The AP may encode, for transmission to the STA in response to the E-ADDTS Req, an E-ADDTS Response QoS Action Frame (E-ADDTS Resp). The E-ADDTS Resp may be encoded to include a status code to indicate whether the QoS setup has been accepted or to indicate whether the QoS setup has been rejected. In these embodiments, when the QoS setup is accepted, the AP may encode the E-ADDTS Resp to further include a QoS setup ID within a QoS setup ID field in the E-ADDTS Resp. The QoS setup ID may be a value that uniquely identifies the QoS setup for the traffic stream, although the scope of the embodiments is not limited in this respect. The AP may then communicate traffic of the traffic stream with the STA in accordance with the accepted/established QoS setup. Examples of these embodiments are illustrated in FIGS. 3 and 4, discussed in more detail below.

In some embodiments, when the QoS setup has been rejected by the AP, the AP is configured to encode the status code of the E-ADDTS Resp to indicate reject and refrain from including the QoS setup ID field in the E-ADDTS Resp.

In some embodiments, the E-ADDTS Req may include at least a QoS category, a dialog Token, a Traffic Description, and an optional Traffic Classification (TCLAS), the E-ADDTS Req being devoid of a QoS setup ID field. In these embodiments, the AP may encode the E-ADDTS Resp to include at least a same value of the dialog token from the E-ADDTS Req, although the scope of the embodiments is not limited in this respect.

In some embodiments, to modify the accepted or established QoS setup, the AP may encode an autonomous E-ADDTS Resp with a dialog token set to a predetermined value (e.g., zero) and with the QoS setup ID field indicating the QoS setup ID of the established QoS setup. In these embodiments, modifications to the established QoS setup are indicated in one or more other fields of the E-ADDTS Resp including of a Traffic Description field, an optional Traffic Classification field and an optional Multi-Link Operation field, although the scope of the embodiments is not limited in this respect. An example of an AP modifying an established QoS setup is illustrated in FIG. 4, discussed in more detail below.

In some embodiments, the AP may decode a E-ADDTS Req received from the STA, the E-ADDTS req including a QoS setup ID field indicating the QoS setup ID of the established QoS setup indicating that the STA is requesting modification of the QoS setup. In these embodiments, modifications to the established QoS setup are indicated in one or more other fields of the E-ADDTS Req including of a Traffic Description field, an optional Traffic Classification field and an optional Multi-Link Operation field, although the scope of the embodiments is not limited in this respect. An example of STA modifying of an established QoS setup is illustrated in FIG. 3, discussed in more detail below.

In some embodiments, the Traffic Description field of an E-ADDTS Req received from the STA or the Traffic description field of an E-ADDTS Resp sent by the AP is configurable to indicate whether the Traffic Description field is a basic TSPEC element, a TSPEC Transmit Opportunity element or a TSPEC-lite element. In these embodiments, the TSPEC Transmit Opportunity element, when included in the E-ADDTS Req, may comprise information that characterizes QoS traffic requirements in terms of transmit opportunity requirements. In these embodiments, the TSPEC-lite element, when included in the E-ADDTS Req, may comprise Packet Delivery Ratio, Flags, Jitter, Criticality, and Tolerance to Loss, although the scope of the embodiments is not limited in this respect.

In some embodiments, when the Traffic Description field is a TSPEC Transmit Opportunity element, the TSPEC Transmit Opportunity element may include an assigned transmission opportunity (TXOP) when included in the E-ADDTS Resp and when the QoS setup has been accepted or is being modified by the AP, although the scope of the embodiments is not limited in this respect.

In some embodiments, the AP may determine whether the AP can support the requested QoS based on the QoS category, the Traffic Description, and the Traffic Classification (TCLAS). In these embodiments, when the AP determines it can support the QoS described in the E-ADDTS Req, the AP may encode the status code field of the E-ADDTS Resp to indicate acceptance, although the scope of the embodiments is not limited in this respect.

Figure 5:
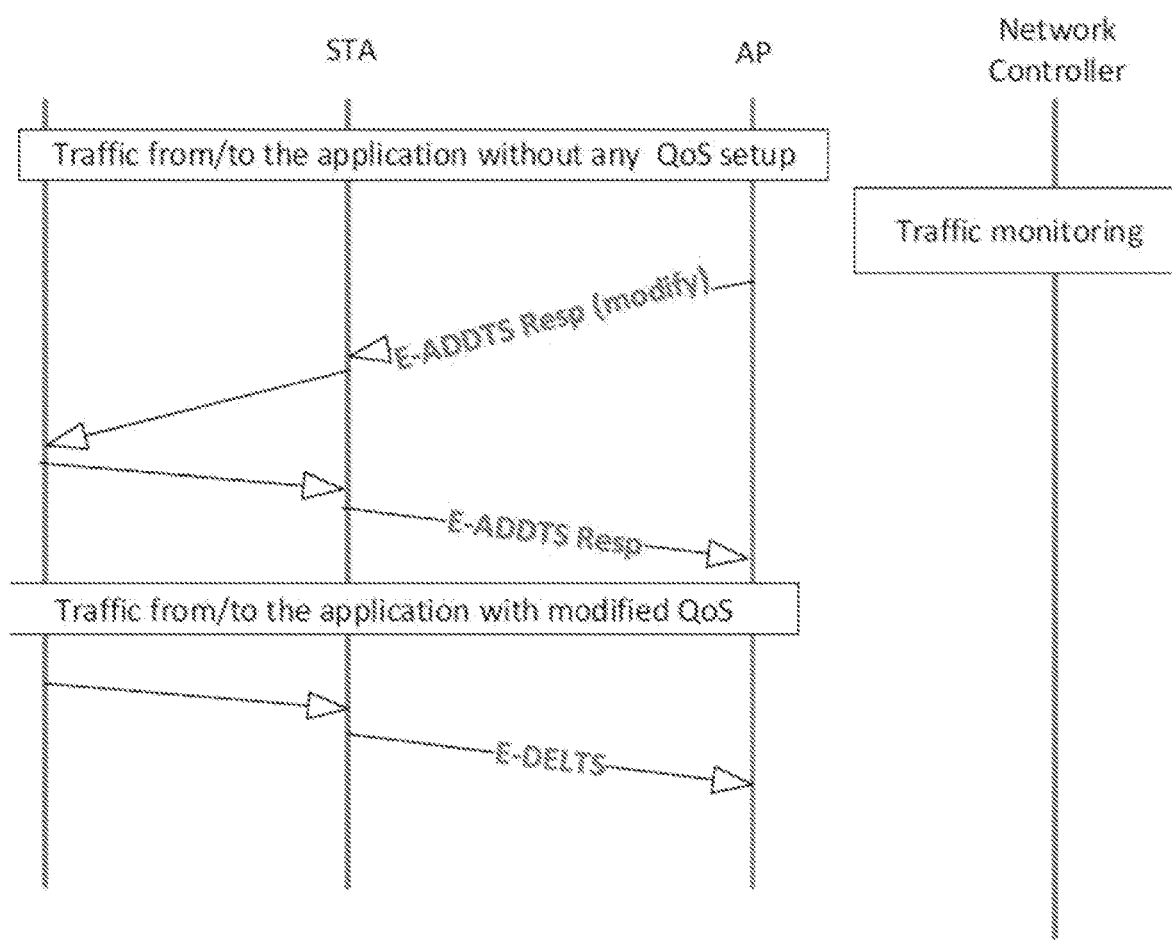
FIG. 5 illustrates a QoS setup by the AP based on traffic monitoring, in accordance with some embodiments.

In some embodiments, the AP may also monitor traffic communicated with the STA without an established QoS setup to determine QoS requirements for the traffic. In these embodiments, to establish a QoS setup for the traffic, the AP may encode an ADDTS Resp for transmission to the STA to initiate establishment of the QoS setup of the traffic. The ADDTS Resp may indicate the determined QoS requirements for the traffic. The AP may decode an ADDTS Resp received from the STA. The ADDTS Resp may indicate acceptance or rejection of the QoS setup for the traffic. When the ADDTS Resp indicated acceptance of the QoS setup, the AP may communicate the traffic with the STA in accordance with the established QoS setup (i.e., a modified QoS), although the scope of the embodiments is not limited in this respect. An example of a QoS setup and establishment by an AP based on traffic monitoring is illustrated in FIG. 5, discussed in more detail below.

Some embodiments are directed to a non-transitory computer-readable storage medium that stores instructions for execution by processing circuitry of an access point (AP). The AP may be configured as a Quality-of-Service (QoS) Management AP to support QoS Management features and perform a QoS Management Protocol.

Some embodiments are directed to a station (STA) configured as a Quality-of-Service (QoS) Management STA to support QoS Management features and perform a QoS Management Protocol. In these embodiments, as part of the QoS Management Protocol, the STA may be configured to encode an Enhanced Add Traffic Stream (E-ADDTS) Request QoS Action Frame (E-ADDTS Req) for transmission to an access point (AP) to initiate QoS setup for a traffic stream. The AP may be a QoS Management AP configured to support the QoS Management features and configured to perform the QoS Management protocol. In these embodiments, the STA may decode, from to the AP in response to the E-ADDTS Req, an E-ADDTS Response QoS Action Frame (E-ADDTS Resp). The E-ADDTS Resp may include a status code to indicate whether the QoS setup has been accepted by the AP or to indicate whether the QoS setup has been rejected by the AP. In these embodiments, when the QoS setup is accepted, the E-ADDTS Resp may further include a QoS setup ID within a QoS setup ID field in the E-ADDTS Resp. In these embodiments, the QoS setup ID may comprise a value that uniquely identifies the QoS setup for the traffic stream, although the scope of the embodiments is not limited in this respect.

Figure 2:
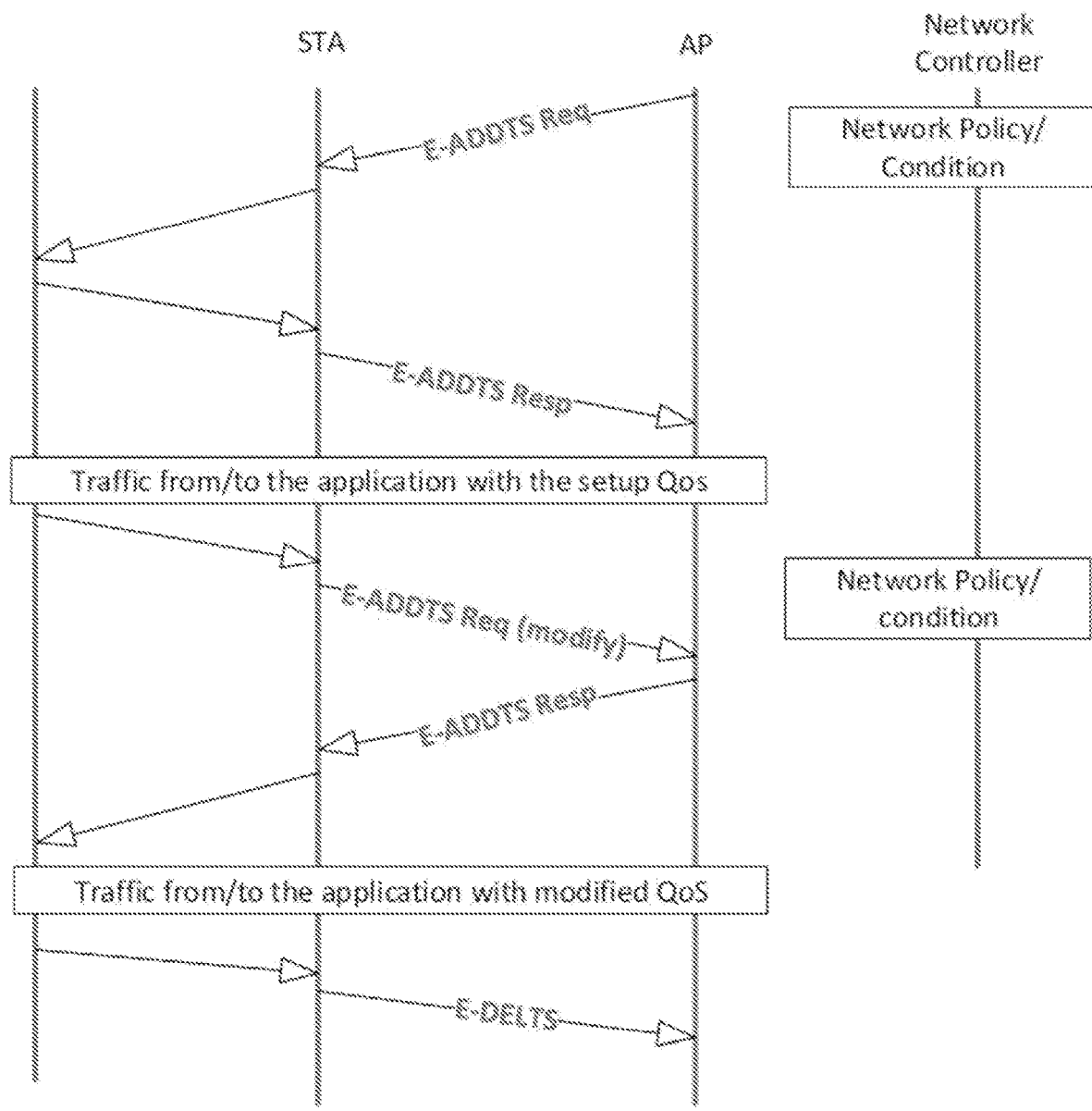
FIG. 2 illustrates AP initiation of a QoS Setup and STA amendment of the QoS Setup midway, in accordance with some embodiments.

In these embodiments, the STA may communicate traffic of the traffic stream with the AP in accordance with the accepted/established QoS setup. Example of embodiments in which the STA initiates the QoS setup are illustrated in FIG. 2. In these embodiments, when the QoS setup has been rejected by the AP, the status code of the E-ADDTS Resp indicates reject and the E-ADDTS Req is devoid of a QoS setup ID field.

In the current IEEE 802.11 specification, STAs signal their QoS requirements using Add Traffic Stream (ADDTS) request frame in which they include a traffic specification (TSPEC) element that describes the traffic; and optionally a TCLAS element in which parameters used to classify traffic that belong to the traffic are specified. The AP on receipt of the ADDTS Request responds with an ADDTS Response in which it either indicates that the requested QoS traffic has been admitted; or rejected. The decision to admit or reject is based on the availability to resources at the AP and what other QoS traffic has been admitted prior to the receipt of this ADDTS Request. At any point in time after an ADDTS Request has been admitted, a delete traffic stream (DELTS) Request can be transmitted either by the AP or the STA to delete the QoS setup for the corresponding traffic.

Example embodiments of the present disclosure relate to systems, methods, and devices for an extensible Enhanced QoS framework for signaling requirements; managing and policing QoS setup in a Wireless Network.

In one or more embodiments, an enhanced QoS system may facilitate a flexible yet versatile QoS framework that renders the signaling, management and policing of QoS in a wireless network, complete.

In one or more embodiments, an enhanced QoS system may facilitate a new set of QoS action frames that can be sent by a STA or an AP to establish a QoS setup based on a set of parameters that describe the traffic (e.g., MAC service data unit (MSDU) size, periodicity, required latency, required reliability, etc.). Also, based on a minimal set of transmit requirements indicating transmit opportunities required in order to provide the corresponding flow with a specific QoS. Also, flexibility to define parameters for other features in newer 802.11 amendments that enable QoS (e.g., to leverage MLD).

In one or more embodiments, an enhanced QoS system may facilitate an alternate QoS Setup in response to a request from the STA that provides the requested QoS but better fits the AP/Network condition.

In one or more embodiments, an enhanced QoS system may facilitate amending an established QoS setup that maintains the current QoS but improves network performance.

In one or more embodiments, an enhanced QoS system may facilitate amending an established QoS setup when the AP determines changes in the network policy or network conditions.

In one or more embodiments, an enhanced QoS system may facilitate amending an established QoS setup as needed to match the application performance.

In one or more embodiments, an enhanced QoS system may facilitate amending an established QoS setup based on the outcome of QoS policing by the AP.

In addition, the proposed mechanism allows for the STA to start QoS traffic without explicitly setting up QoS with the AP. The AP based on the analysis of the QoS traffic from and to the STA, could setup QoS.

In one or more embodiments, an enhanced QoS system may facilitate adaptive QoS for both the STA and the AP resulting in better application performance over the wireless network and potentially better network utilization (detects and mitigates over-subscription to accommodate worst case network conditions).

FIGS. 1-5 depict illustrative schematic diagrams for enhanced QoS, in accordance with one or more example embodiments of the present disclosure.

In one or more embodiments, an enhanced QoS system may facilitate mechanisms to amend the admitted QoS setup:

(a) in order for the AP to match network conditions/policies,
(b) for the STA to the improve application performance,
(c) for the AP to police the QoS setup and specifically address the case where the resources dedicated for QoS setup are under-utilized.

In addition, the defined mechanism is extensible to:

(a) address emerging traffic types like time-sensitive traffic, Augmented/Virtual reality traffic, etc.,
(b) leverage new features developed as part of emerging IEEE802.11 amendments like 802.11be Multi-link Domains (MLDs).

Figure 1:
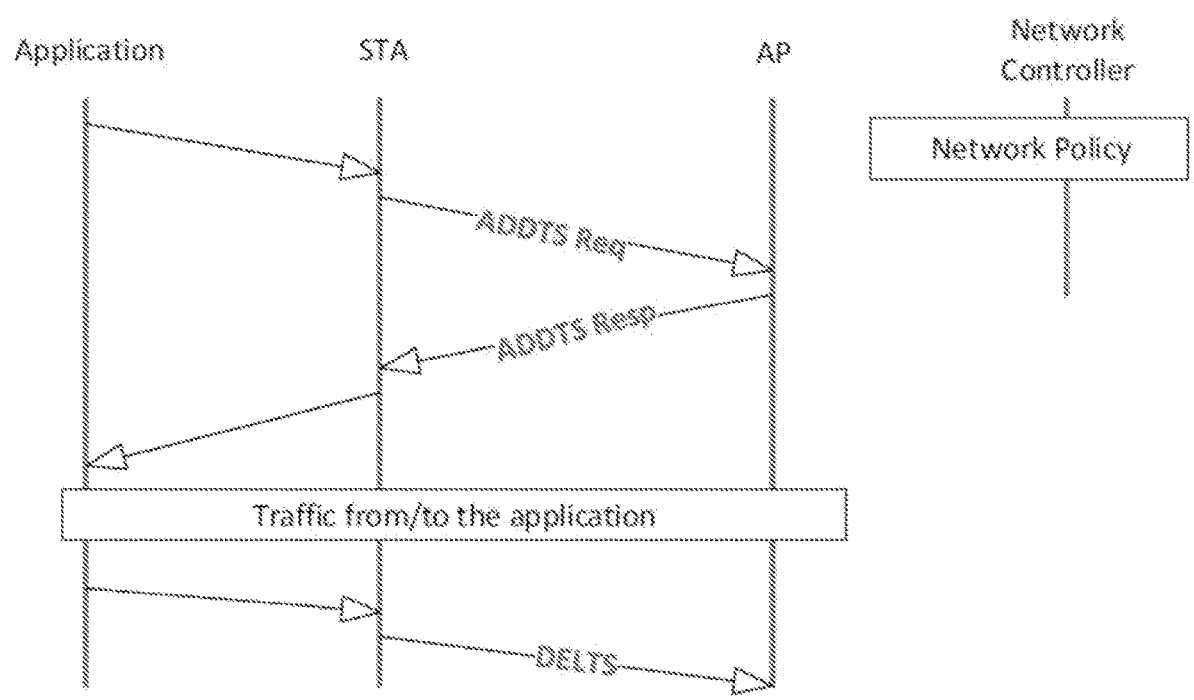
FIG. 1 illustrates a QoS Setup Mechanism of IEEE 802.11.

FIG. 1 illustrates a QoS Setup Mechanism of IEEE 802.11. IEEE802.11 REVmd D4.0 defines a mechanism named Mirrored Stream Classification Service (MSCS) that provides a means for mirroring the QOS setup for uplink traffic for the corresponding downlink traffic. The QoS Setup procedure is based on differentiated services code point (DSCP) tags in the Ethernet Header of the packets corresponding to the QoS Traffic. This does not address scenarios where there is no explicit DSCP tags and does not provide for uplink QoS setup.

Depends on DSCP setting in the Ethernet Header, does not address uplink QoS Setup, does not allow for classifying individual traffic streams (uses a traffic classification mask that matches all source/destination IP-address/port, protocol or none. So, the setup cannot differentiate a stream based on a specific <source/destination IP-address/port, protocol>5-tuple (not granular).

Enhanced ADDTS Request/ADDTS Response and Enhanced DELTS action frames are proposed in this disclosure. These are new QoS Action frames (Table 9-346 of IEEE802.11 REVmd D3.2).

The Enhanced ADDTS Request (E-ADDTS Req) QoS action frame is used to either setup the QoS or modify an existing QoS Setup. The Enhanced ADDTS Response (E-ADDTS Resp) QoS action fame is the corresponding response. When the corresponding QoS traffic flow ends, an E-DELTS is action frame is used to delete the corresponding QoS setup.

The E-ADDTS Request QoS action frame is described in the following table:

| Order | Information | Notes |
|---|---|---|
| 1 | Category | 1 (QoS Category) |
| 2 | QoS Action | To be assigned a unique value |
| 3 | Dialog Token | 1-255 |
| 4 | QoS Setup ID | Reserved for a new QoS Setup; ID of an existing QoS Setup that is modified |
| 5 | Flags | Bits to describe traffic requirements like redundancy over the wireless link |
| 6 | Traffic Description | TS PEC-lite, TS PEC-Transmit Opportunity, etc. |
| 7 | Traffic Classification | TCLAS |
| 8 | Multi-Link Operation-Specific | Optional |
| 9 | Other elements (as .11be evolves) | Optional (e.g., Intra-AC Priority element - details to be defined as QoS .11be evolves) |
| 10 | Vendor-Specific | Optional |

A STA may initiate a QoS setup by sending an E-ADDTS Request to the associated AP. The STA indicates the QoS characteristics of the traffic using the Traffic Description, Traffic Classification and Multi-Link Operation Specific fields. The QoS Setup ID field in this case is reserved.

The AP on receipt of the E-ADDTS Request from the STA responds with a corresponding E-ADDTS Response. The Dialog Token in the E-ADDTS Response is the same as that in the corresponding E-ADDTS Request. If the AP determines that it can support the requested QoS described in the E-ADDTS Request, it sets the Status Code in the E-ADDTS Response to ACCEPT. Otherwise, it is set to REJECT. If the Status Code is ACCEPT, the AP sets the QoS Setup ID to a unique value (in the range 1 to 254) that identifies the QoS setup. Modify operations on the QoS Setup either by the AP or by the STA uses the returned QoS Setup ID to refer to the QoS setup that is to be modified.

A STA may modify an existing QoS setup by sending an E-ADDTS Request to the associated AP by specifying the corresponding QoS setup id in the QoS Setup ID field of the E-ADDTS Request frame. The modifications are indicated in Traffic Description, Traffic Classification and Multi-Link Operation Specific fields.

The E-ADDTS Response QoS action frame is described in the following table:

| Order | Information | Notes |
|---|---|---|
| 1 | Category | 1 (QoS Category) |
| 2 | QoS Action | To be assigned a unique value |
| 3 | Dialog Token | Same as that of the corresponding E-ADDTS Request |
| 4 | Status Code | Accept, Reject, Modified, New |
| 5 | QoS ID | ID assigned to the QoS setup; ID of the QoS setup that is accepted/modified |
| 6 | Flags | Bits describing traffic requirements like redundancy. Valid only if the Status Code is ACCEPT (same as that in the corresponding E-ADDTS Req) or MODIFY |
| 7 | Traffic Description (TS PEC-lite, TSPEC- Transmit Opportunity, etc.) | TS PEC-lite, protected Transmit Window (to be defined), etc. If a TSPEC-lite was specified in the E-ADDTSRequest and if the Status Code in the corresponding E-ADDTS Response is ACCEPT this field may be the same; or it may be a TSPEC-Transmit Opportunity. With TSPEC-Transmit Opportunity, the request includes a description of the QoS Requirements while the |

-continued

| Order | Information | Notes |
|---|---|---|
| | | response (when the Status Code is ACCEPT) includes the protected Transmit Window (to be defined) assigned to the STA for the QoS traffic. Alternate traffic description if an existing QoS setup is modified |
| 8 | Reason Code | Reserved if Status Code is Accept; otherwise provides reason for Reject. |
| 9 | Traffic Classification (TCLAS) | Optional |
| 10 | Multi-Link Operation-Specific | Optional—may be multiple fields depending on what MLO features are relevant to QoS Setup/QoS Support |
| 11 | Vendor-Specific | Optional |

The AP may initiate a QoS setup as follows:
E-ADDTS Request/E-ADDTS Response as would the STA The AP may at any time modify an established QoS setup by sending an autonomous E-ADDTS Response with the Dialog Token set to 0 and the QoS ID set to that of the QoS setup that the E-ADDTS Response modifies.

Traffic Description is a description of the traffic for which the QoS is setup.

TSPEC-lite—a modified version of the basic TSPEC element. A reserved bit in the basic TSPEC element set to 1 can indicate if the element is the basic TSPEC element or the new TSPEC-lite element.

| Parameter | Size | Value | Description |
|---|---|---|---|
| Profile Lifetime | 1 octet | | Maintain lifetime for the flow - in seconds, 0 indicates infinite lifetime |
| Max MSDU size | 2 octets | | Maximum size of MSDU |
| Latency Bound | 1 octet | | Expected worst case latency in ms. |
| Min Service Interval | 4 octets | | Requested min periodicity of service |
| Jitter | 1 octet | | (variation in latency) Network jitter in ms. |
| Burst Size | 4 octets | | Max aggregate size MSDUs that arrive within a SP |
| Packet delivery ratio | 1 octet | | Expected PDR within latency bound |
| Flags | 1 Octet | | Place holder for anything special about the corresponding traffic stream that needs to made known to the peer |
| Criticality | | | Low/Medium/High - how critical is this stream for the operation of the system? |
| Tolerance to loss | | Yes/ No | how many contiguous packets can be lost before the application gets into a 'panic mode'? E.g., 2/10 (2 consecutive packets lost in the last 10 packets received) |
| Direction | 1 octet | 0-2 | 0 = UL, 1 = DL, 2 = bi-directional |

TSPEC-Transmit Opportunity—a variation of the basic TSPEC that characterizes the traffic in terms transmit opportunity requirements.

| Parameter | Size | Value | Description |
|---|---|---|---|
| Profile Lifetime | 1 octet | | Maintain lifetime for the flow - in seconds, 0 indicates infinite lifetime |
| Tx Time | 1 octet | | Duration for UL(4 bits) and DL(4 bits) Tx in ms. |
| Periodicity/ Cycle Time | 2 octets | | Requested cycle time |
| Start Time | 8 octets | | Start Time expressed in units of TU indicating the time at which the first MSDU corresponding to the QoS traffic is expected to be transmitted. The value in the E-A.DDTS Response would be the same as it was in the corresponding E-ADDTS Request |
| Direction | 1 octet | 0-2 | 0 = UL, 1 = DL, 2 = bi-directional |
| UP-Map | 1 octet | | UPs for which this TWT should be used. Used for policing traffic. The policing logic watches for appropriate UP to be assigned to the traffic that is sent/received using the corresponding QoS Setup. |
| Assigned transmit opportunity | | TWT or TWT-like element | Included only in E-ADDTS Response when the Status Code is ACCEPT or MODIFY and indicates the assigned transmit opportunity for the corresponding QoS setup |

FIG. 2 illustrates a scenario where the AP initiates QoS Setup with a STA and the STA modifies the QoS setup midway through the flow.

FIG. 3 illustrates a scenario when the STA sets up the QoS and midway through the application traffic flow amends the QoS setup.

FIG. 4 illustrates a scenario where the AP amends a QoS setup midway through the QoS traffic flow.

FIG. 5 illustrates a case where the STA initiates QoS traffic without setting up QoS explicitly (no E-ADDTS Req/Resp exchange), and the AP subsequently based on the observed traffic to/from the STA determines an appropriate QoS for the traffic and sets it up using a E-ADDTS Resp exchange with the STA.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D3.2, March 2020, and IEEE draft specification IEEE P802.11ax/D5.0, October 2019 are incorporated herein by reference in their entireties.

Figure 6:
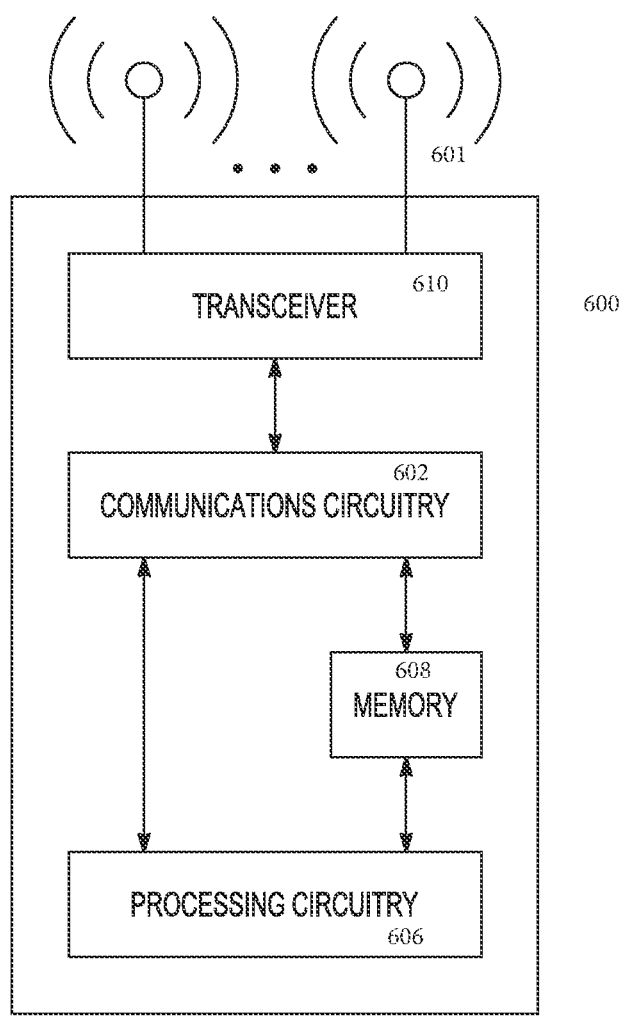
FIG. 6 illustrates a functional block diagram of a wireless communication device, in accordance with some embodiments.

FIG. 6 illustrates a functional block diagram of a wireless communication device, in accordance with some embodiments. In one embodiment, FIG. 6 illustrates a functional block diagram of a communication device (STA) that may be suitable for use as an AP STA, a non-AP STA or other user device in accordance with some embodiments. The communication device 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 600 may include communications circuitry 602 and a transceiver 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 600 may include one or more of a keyboard, a display, a non-volatile memory port, multiple antennas, a graphics processor, an application processor, speakers, and other mobile device elements. The display may be an LCD screen including a touch screen.

Although the communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 600 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an access point station (AP), the apparatus comprising:

processing circuitry; and memory, wherein the processing circuitry is configured to:

decode a stream classification service (SCS) request frame from a non-AP station (STA) requesting creation of an SCS stream with the AP, the SCS request frame including an SCS identifier (SCSID) to identify the requested SCS stream, a traffic classification (TCLAS) element, and a quality-of-service (QoS) characteristics element, wherein the QoS characteristics element includes QoS parameters defining traffic characteristics and QoS expectations of traffic flows that belong to the requested SCS stream, wherein the QoS parameters include at least a minimum service interval, a delay bound, a maximum data unit size, a service start time, a burst size, a delivery ratio defining an acceptable data unit loss for the requested SCS stream, and a direction, encode an SCS response frame for transmission to the STA, the SCS response frame including the SCSID of the requested SCS stream and a status field indicating whether the AP has accepted or denied the requested SCS stream, wherein when the status field is encoded to indicate that the AP has denied the requested SCS stream and that the requested SCS stream is rejected with suggested changes, the SCS response frame is encoded to include a QoS characteristics element signalling suggested QoS parameters for the requested SCS stream, wherein when the AP has indicated acceptance of the requested SCS stream and when the QoS characteristics element in the SCS request frame indicated downlink for the direction, the processing circuitry is configured to encode downlink frames of traffic flows that belong to the requested SCS stream for transmission to the STA, the downlink frames transmitted in accordance with the delay bound of the QoS parameters, the downlink frames including the SCSID, wherein when the AP has indicated acceptance of the requested SCS stream and when the QoS characteristics element indicated uplink for the direction, the processing circuitry is configured to decode uplink frames received from the STA within an interval that at least meets the minimum service interval indicated in the QoS parameters, the uplink frames encoded to include the SCSID, and wherein when the AP has indicated acceptance of the requested SCS stream and when the QoS characteristics element indicated uplink for the direction, the AP is configured to enable transmission of the uplink frames from the STA within the interval.

2. The apparatus of claim 1, wherein the suggested QoS parameters included in the QoS characteristics element of the SCS response frame comprise QoS parameters that differ from the QoS parameters of the SCS request frame, the QoS parameters that differ comprise one or more of the minimum service interval and the service start time.

3. The apparatus of claim 2, wherein the TCLAS element indicates a requested traffic classification for the requested SCS stream.

4. The apparatus of claim 3, wherein when the status field indicates that the AP has denied the requested SCS stream because the requested TCLAS is not supported by the AP, the status field of the SCS response frame is set to indicate that the requested TCLAS is not supported by the AP.

5. The apparatus of claim 4, wherein when the AP has indicated acceptance of the requested SCS stream, the processing circuitry is configured to encode the SCS response frame to include a QoS characteristics element that includes the status field.

6. The apparatus of claim 5, wherein when the status field is to indicate that the AP has denied the requested SCS stream because the requested TCLAS is not supported by the AP, the processing circuitry is configured to refrain from including a QoS characteristics element in the SCS response frame.

7. The apparatus of claim 6, wherein the AP is an extremely high-throughput (EHT) AP, and wherein the non-AP STA is an EHT STA.

8. The apparatus of claim 7, wherein the EHT AP is configured to operate in accordance with one of the IEEE 802.11 standards.

9. A non-transitory computer-readable storage medium that stores instructions for execution by processing circuitry of an access point station (AP), the processing circuitry configured to:
  decode a stream classification service (SCS) request frame from a non-AP station (STA) requesting creation of an SCS stream with the AP, the SCS request frame including an SCS identifier (SCSID) to identify the requested SCS stream, a traffic classification (TCLAS) element, and a quality-of-service (QoS) characteristics element,
  wherein the QoS characteristics element includes QoS parameters defining traffic characteristics and QoS expectations of traffic flows that belong to the requested SCS stream,
  wherein the QoS parameters include at least a minimum service interval, a delay bound, a maximum data unit size, a service start time, a burst size, a delivery ratio defining an acceptable data unit loss for the requested SCS stream, and a direction,
  encode an SCS response frame for transmission to the STA, the SCS response frame including the SCSID of the requested SCS stream and a status field indicating whether the AP has accepted or denied the requested SCS stream,
  wherein when the status field is encoded to indicate that the AP has denied the requested SCS stream and that the requested SCS stream is rejected with suggested changes, the SCS response frame is encoded to include a QoS characteristics element signalling suggested QoS parameters for the requested SCS stream,
  wherein when the AP has indicated acceptance of the requested SCS stream and when the QoS characteristics element in the SCS request frame indicated downlink for the direction, the processing circuitry is configured to encode downlink frames of traffic flows that belong to the requested SCS stream for transmission to the STA, the downlink frames transmitted in accordance with the delay bound of the QoS parameters, the downlink frames including the SCSID,
  wherein when the AP has indicated acceptance of the requested SCS stream and when the QoS characteristics element indicated uplink for the direction, the processing circuitry is configured to decode uplink frames received from the STA within an interval that at least meets the minimum service interval indicated in the QoS parameters, the uplink frames encoded to include the SCSID, and
  wherein when the AP has indicated acceptance of the requested SCS stream and when the QoS characteristics element indicated uplink for the direction, the AP is configured to enable transmission of the uplink frames from the STA within the interval.

10. The non-transitory computer-readable storage medium of claim 9, wherein the suggested QoS parameters included in the QoS characteristics element of the SCS response frame comprise QoS parameters that differ from the QoS parameters of the SCS request frame, the QoS parameters that differ comprise one or more of the minimum service interval and the service start time.

11. The non-transitory computer-readable storage medium of claim 10, wherein the TCLAS element indicates a requested traffic classification for the requested SCS stream.

12. The non-transitory computer-readable storage medium of claim 11, wherein when the status field indicates that the AP has denied the requested SCS stream because the requested TCLAS is not supported by the AP, the status field of the SCS response frame is set to indicate that the requested TCLAS is not supported by the AP.

13. The non-transitory computer-readable storage medium of claim 12, wherein when the AP has indicated acceptance of the requested SCS stream, the processing circuitry is configured to encode the SCS response frame to include a QoS characteristics element that includes the status field.

14. The non-transitory computer-readable storage medium of claim 13, wherein when the status field is to indicate that the AP has denied the requested SCS stream because the requested TCLAS is not supported by the AP, the processing circuitry is configured to refrain from including a QoS characteristics element in the SCS response frame.

15. An apparatus for non-access point station (STA), the apparatus comprising: processing circuitry; and memory, wherein the processing circuitry is configured to:
  encode a stream classification service (SCS) request frame for transmission to an access point station (AP) to request creation of an SCS stream,
  the SCS request frame encoded to include an SCS identifier (SCSID) to identify the requested SCS stream, a traffic classification (TCLAS) element, and a quality-of-service (QoS) characteristics element,
  the QoS characteristics element encoded to include QoS parameters defining traffic characteristics and QoS expectations of traffic flows that belong to the requested SCS stream; and
  wherein the QoS characteristics element is encoded in the SCS request frame to include the QoS parameters including at least a minimum service interval, a delay bound, a maximum data unit size, a service start time, a burst size, a delivery ratio defining an acceptable data unit loss for the requested SCS stream, and a direction, decode an SCS response frame received from the AP, the SCS response frame including the SCSID of the requested SCS stream and a status field indicating whether the AP has accepted or denied the requested SCS stream associated with the SCSID, wherein when the status field indicates that the AP has denied the requested SCS stream and when the status field is indicates that the request is rejected with suggested changes, the SCS response frame includes a QoS characteristics element signalling suggested QoS parameters for the requested SCS stream, wherein when the AP has indicated acceptance of the requested SCS stream and when the QoS characteristics element in the SCS request frame indicated downlink for the direction, the processing circuitry is configured to decode downlink frames of traffic flows that belong to the requested SCS stream received from the AP, the downlink frames transmitted in accordance with the delay bound of the QoS parameters, the downlink frames including the SCSID, wherein when the AP has indicated acceptance of the requested SCS stream and when the QoS characteristics element indicated uplink for the direction, the processing circuitry is configured to encode uplink frames for transmission to the AP within an interval that at least meets the minimum service interval indicated in the QoS parameters, the uplink frames encoded to include the SCSID, and wherein when the AP has indicated acceptance of the requested SCS stream and when the QoS characteristics element indicated uplink for the direction, transmission of the uplink frames from the STA within the interval is enabled by the AP.

* * * * *